United States Patent [19]

Takahashi

[11] Patent Number: 5,761,715
[45] Date of Patent: Jun. 2, 1998

[54] INFORMATION PROCESSING DEVICE AND CACHE MEMORY WITH ADJUSTABLE NUMBER OF WAYS TO REDUCE POWER CONSUMPTION BASED ON CACHE MISS RATIO

[75] Inventor: Masafumi Takahashi, Kanagawa-ken, Japan

[73] Assignee: Kabushiki Kaisha Toshiba, Kawasaki, Japan

[21] Appl. No.: 694,303

[22] Filed: Aug. 8, 1996

[30] Foreign Application Priority Data

Aug. 9, 1995 [JP] Japan .................................. 7-203533

[51] Int. Cl.$^6$ .................................................. G06F 13/00
[52] U.S. Cl. .................. 711/128; 711/128; 711/129; 711/137; 711/147; 364/200; 365/227; 395/750.01; 395/750.03
[58] Field of Search ......................... 711/128, 137, 711/129, 147; 365/227; 364/200; 395/750.01, 750.03

[56] References Cited

U.S. PATENT DOCUMENTS

| | | |
|---|---|---|
| 4,315,312 | 2/1982 | Schmidt .................... 364/200 |
| 5,018,061 | 5/1991 | Kishigami et al. ............ 364/200 |
| 5,283,890 | 2/1994 | Petolino, Jr. et al. .......... 395/425 |
| 5,430,683 | 7/1995 | Hardin et al. .............. 365/227 |
| 5,509,135 | 4/1996 | Steely, Jr. ................ 711/147 |
| 5,625,826 | 4/1997 | Atkinson ................ 395/750 |

FOREIGN PATENT DOCUMENTS

93/12480  6/1993  WIPO .
95/02864  1/1995  WIPO .

Primary Examiner—Tod R. Swann
Assistant Examiner—Mehdi Namazi
Attorney, Agent, or Firm—Foley & Lardner

[57] ABSTRACT

In a cache memory of a set associative type, a cache-miss rate measuring circuit 140 measures the cache-miss rate during way access operation, the way number control circuit 150 determines the number of ways to be accessed based on a change of the measured cache-miss rate and transfers the determined information about the ways to be accessed to the power control circuit 160. The cache memory controls as follows: When the cache-miss rate is decreased under the condition that the number of ways is reduced, the number of ways to be accessed is changed to the original number of ways and when the cache-miss rates before and after switching of the number of ways are not changed, the number of ways to be accessed is decreased, and power consumption reduced.

18 Claims, 5 Drawing Sheets

FIG.5

| CACHE-MISS RATE VALUE | CACHE-MISS RATE (%) | RELATIVE EXECUTION TIME PERIOD |
|---|---|---|
| 1 | 100~50 | 6.7~3.85 |
| 2 | 50~25 | 3.85~2.425 |
| 3 | 25~12.5 | 2.425~1.712 |
| 4 | 12.5~6.25 | 1.712~1.356 |
| 5 | 6.25~3.12 | 1.356~1.178 |
| 6 | 3.12~1.56 | 1.178~1.089 |
| 7 | 1.56~0.78 | 1.089~1.045 |

INFORMATION PROCESSING DEVICE AND CACHE MEMORY WITH ADJUSTABLE NUMBER OF WAYS TO REDUCE POWER CONSUMPTION BASED ON CACHE MISS RATIO

BACKGROUND OF THE INVENTION

1. Field of the Invention

The present invention relates to cache memories of a low power consumption type and information processing devices having the cache memories.

2. Description of the Prior Art

Recently, in order to overcome a bottle-neck of a memory access operation in conventional information processing devices, the information processing devices have an microprocessor and a cache memory system and they are formed on a single semiconductor chip. The volume and the size of the cache memory system mounted or the single semiconductor chip is increasing every year. As a result, the power consumption of the cache memory formed on the single semiconductor chip reaches approximately 30 percents of the total power consumption of the information processing device. Therefore it is required to reduce the power consumption of a cache memory incorporated in the information processing device mounted on the semiconductor single chip according to recent movement toward a low power consumption of the semiconductor single chip.

On the other hand, there are various kinds of cache memories, called as "n-way set associative type", because this cache memory of the n-way set associative type has a higher cache-hit rate and a lower volume in configuration. Cache memories of the 2-way set associative type and the 4-way set associative type are commonly and widely used in all over the world. As one of methods to reduce the power consumption of the set associative type cache memory mounted on the single semiconductor chip, there is a well-known method that the number of ways to be executed in a cache memory is reduced. For example, there are a semiconductor memory having a low power consumption type cache memory, named as "SH series" provided by HITACHI Inc. In the cache memory of this type, one or some ways in a plurality of ways in a cache memory, whose tag of this way is agreed with the tag transferred from a micro-processor through a bus group, is selected while an information processing device enters a low power consumption mode. In this case, the cache memory operates in the low power consumption mode. In this low power consumption mode, although it can be achieved to reduce the power consumption of the cache memories, the operation speed of the cache memories becomes lower. Thus, the performance of the cache memories become low, but the power consumption of the cache memories in the low power consumption mode can be reduced to approximately ½ of the case that all of the ways in the cache memory are executed, and to approximately ¼ of the case of the cache memory of 4-way-set associative.

In other low power consumption method, the number of ways to be executed in the cache memory becomes decreased, so that the cache-hit rate becomes low. Accordingly, the number of access operations to an external memory (such as a main memory, not the cache memories) is increased and the access operation speed becomes low. In other words, the performance of the information processing device becomes low because the operation time of the information processing device becomes long. This causes the increasing of the power consumption of the information processing device. The relationship between the low power consumption mode for a cache memory and the amount of actually reduced power consumption in the information processing device is determined based on the change of cache hit rate in a set associative configuration of cache memories. However, the cache hit rate is also changed by application programs to be executed. So, it is difficult to determine or know what the main cause to reduce the cache hit rate is.

In order to reliably reduce the power consumption of an information processing device in which the number of ways forming a cache memory system is decreased without reducing the cache hit rate, the number of ways to be executed in the cache memory system must be dynamically changed or switched while observing the change of cache hit rate. However, in the prior art, there is no conventional cache memory system and no conventional information processing device having the cache memory system that satisfy this requirement in which the number of ways to be accessed is dynamically switching while checking the change of the cache hit rate in memory access operations.

SUMMARY OF THE INVENTION

Accordingly, an object of the present invention is, with due consideration to the drawbacks of the conventional cache memory and the conventional information processing device described above, to provide a cache memory and an information processing device having the cache memory, which is capable of adjusting that the number of ways to be accessed in the cache memory becomes the optimum number according to operation states of the information processing device, without decreasing the operation speed and the performance of the information processing device while decreasing the power consumption of the information processing device.

In accordance with a preferred embodiment of the present invention, a cache memory of a set associative type comprises: a plurality of ways, cache-miss rate measuring means for measuring a cache miss rate as the number of occurrences of cache-misses, in which no target data item to be accessed is stored in the cache memory, in the plurality of ways, way number determination means for selecting ways to be accessed in the plurality of ways based on the change of the cache-miss rate obtained from the cache-miss rate measuring means, and way operation control means for executing the ways selected by the way number determination means.

Thus, the cache-miss rate measuring means measures the number of the occurrences of cache-misses during a memory access operation mode. For example, the cache-miss rate measuring means stores the value indicating the cache-miss rate obtained by the ratio of the number of the cache-miss occurrences to the number of the memory access operations into a cache-miss rate measuring queue, for example. The way number determination means determines the optimum number of ways to be efficiently accessed based on the change of the cache-miss rate stored in the cache-miss rate measuring queue, for example, and indicates the change of the number of ways to be accessed to the way operation control means. In addition, the way number determination means decreases the number of ways to be accessed, namely switches to the original number of ways, when the cache-miss rate is not decreased under the condition that the number of ways to be accessed is increased. Thus, the way number determination means controls that the number of ways to be accessed is switched to the original number of ways when the cache-miss rate is increased.

In accordance with another preferred embodiment of the present invention, the cache-miss rate measuring means in the cache memory comprises, first count means for counting an occurrence number of the cache miss operations caused in the plurality of ways, second count means for counting an occurrence number of memory access operations, andfirst cache miss rate value store queue for storing at least a value indicating the cache-miss rate at a time. In the cache memory, a value corresponding to a first position of a first value counted from the Most Significant Bit (MSB) in bits forming the second count means is stored as the cache-miss rate into the first cache-miss rate value store queue when the value stored in the first count means reaches a predetermined value.

In accordance with another preferred embodiment of the present invention, the cache memory further comprises an OR circuit incorporated between the plurality of ways and the first count means for detecting an occurrence of the cache-miss operation happened in the plurality of ways and for transferring a data item indicating the occurrence of the cache-miss operation to the first counter means.

In accordance with another preferred embodiment of the present invention, the way number determination means in the cache memory comprises: a second cache-miss rate value store queue for storing the cache-miss rate, transferred from the cache-miss rate measuring means, which has been measured in a previous time; first comparison means for comparing the cache-miss rate at the present time stored in the first cache-miss rate measuring means with the cache-miss rate at the previous time stored in the second cache-miss rate store queue, and control means for receiving the comparison result transferred from the first comparison means when the number of the memory access operations to a memory exceeds a predetermined number, for selecting ways to be accessed in the plurality of ways based on the comparison result, and for transferring information about the selected ways to the way operation control means.

Thus, it is acceptable that a value corresponding to the first bit position of a first flag (for example, the flag "1" in the binary values "0" and "1") counted from the MSB side in a bit array in the second count means in the way number determination means is stored into the first cache-miss rate value store queue as the cache-miss rate. In addition, when the number of ways is decreased based on the determination of the way number determination means, the data items must be stored into the way that will be continuously executed. When the cache-hit during the data read-out operation is happened in the way that will not be continuously accessed, these data items must be stored into the way that will be continuously accessed. Further, it is also acceptable that when the cache-hit during data write-in operation is happened in the way that will not be continuously accessed, these data items must be stored into both the way to be not continuously accessed and the way to be continuously accessed.

In accordance with another preferred embodiment of the present invention, the way operation control means in the cache memory controls the operation of the plurality of ways by switching the supply of electric power source to each of the plurality of ways based on information transferred from the way operation control means. As a result, it can be achieved to reduce the power consumption because the number of ways to be accessed is decreased according to the cache-miss rate without decreasing the performance of the cache memory.

In accordance with another preferred embodiment of the present invention, the cache memory can operate that when the cache-miss operation is happened under a condition that the number of the plurality of ways to be accessed is decreased, data items to be accessed are stored into a first way which would be accessed continuously, and data items to be accessed are stored into the first way when a cache-hit operation is happened in a second way which would not be accessed in following times, the data items to be stored into the second way are also stored into the first way, and these operation are performed during a predetermined time period.

In accordance with another preferred embodiment of the present invention, an information processing device comprises: the cache memory as claimed in claim 1, and a microprocessor connected to the cache memory through buses. In the information processing device, the microprocessor generates a control signal indicating occurrence of the memory access operation to the cache memory and an external memory and transfers the control signal to the cache-miss rate measuring means.

In accordance with another preferred embodiment of the present invention, in the information processing device, at least both of the cache memory and the microprocessor are formed on a single semiconductor chip.

BRIEF DESCRIPTION OF THE DRAWINGS

These and other objects, features, aspects and advantages of the present invention will become more apparent from the following detailed description of the preferred embodiments of present invention taken in conjunction with the accompanying drawings, in which:

FIG. 5 is an explanation diagram showing a relationship between cache-miss rate values, cache-miss rates, and execution time periods in the cache memory incorporated in the micro-processor semiconductor chip shown in FIG. 1.

DESCRIPTION OF THE PREFERRED EMBODIMENTS

Other features of the present invention will become apparent through the following description of preferred embodiments which are given for illustration of the present invention and are not intended to be limiting thereof.

Preferred embodiments of a cache memory according to Hereinafter, configurations and operations of preferred embodiments of the present invention will be explained.

Embodiment 1

Figure 1:
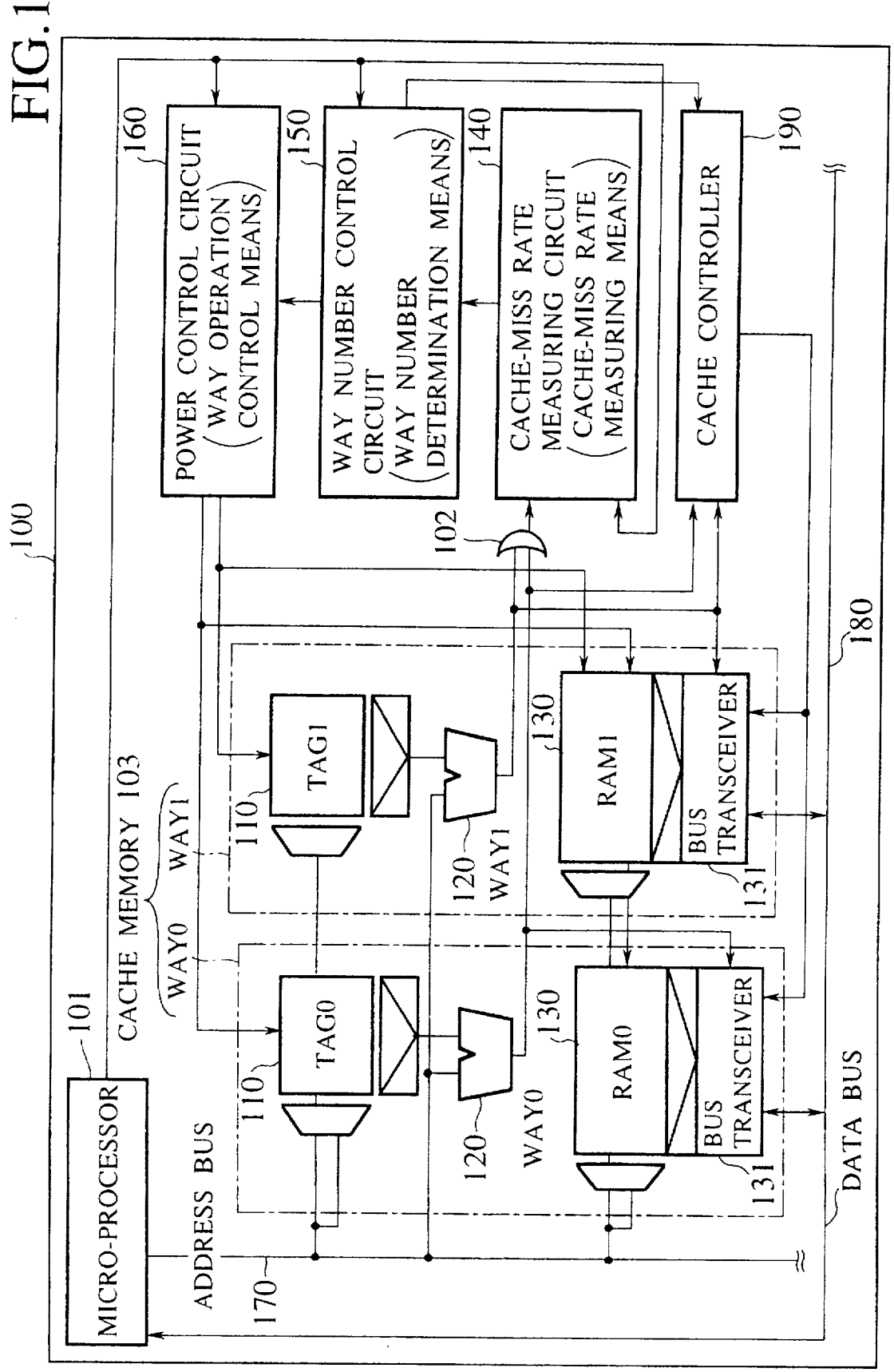
FIG. 1 is a diagram showing a configuration of a microprocessor semiconductor chip as an information processing device incorporating a cache memory of a preferred embodiment of the present invention.

FIG. 1 is a diagram showing a configuration of a microprocessor semiconductor chip 100 as an information processing device incorporating a cache memory 103 of a preferred embodiment of the present invention.

The cache memory 103 shown in FIG. 1 is a 2 set-associative type cache memory comprising way 0 and way 1. Each way 0 and 1 comprises a cache tag memory 110, a comparator 120, a cache data RAM 130, and a bus transceiver 131. The micro-processor semiconductor chip (the information processing device) 100 comprises a microprocessor, a cache-miss rate measuring circuit (or "cache-miss rate measuring means" as used in claims) 140, a way number control circuit (or "way number determination means" as used in claims) 150, a power control circuit (or "way operation control means" as sued in claims) 160, an address bus group 170, a data bus group 180, and a cache controller 190.

Tag data items stored in the cache tag memory 110 are addressed by a data in an index field in address data transferred through the address bus group 170 from the micro-processor 101. The cache tag memory 110 stores/transfers tag data in an address data item. The comparator 120 compares the tag data transferred from cache tag memory 110 with the tag data in the tag field of the address transferred through the address bus group 170. When both tag data items are same, for example, the comparator 120 generates a control signal of a high level indicating the agreement of both of the tag data items to an OR circuit 102.

Data items stored in the cache data RAM 130 are addressed by data in the index field of the address transferred through the address bus group 170. The cache data RAM 130 stores data items corresponding to the tag data items. When the cache data RAM 130 receives the control signal indicating that both tag addresses are same to each other, as detected by the comparator 120, the cache data RAM 130 receives the agreement signal from the comparator 130. Then the cache data RAM 130 transfers data items corresponding to the tag address to the data bus group 180 through the bus transceiver 131.

The OR circuit 102 executes OR arithmetic operation between the control signals transferred from the comparator 130 in each tag memory 110. For example, when the cache-miss is occurred, the control signal of a high level indicating the occurrence of the cache-miss is transferred from each comparator 120 to the OR circuit 102. Here, the technical word "cache-miss" or "cache-miss operation" means that both the tag address in the address data on the address bus group 170 and the tag address stored in the tag memory 110 are not same to each other (not agreed with to each other) in the comparison operation executed by the comparator 120. For example, the "cache-hit" means that both the tag address in the address data on the address bus group 170 and the tag address stored in the tag memory 110 are agreed to each other in the comparison operation executed by the comparator 120.

The cache-miss rate measuring circuit 140 receives a result signal of the OR arithmetic operation transferred from the OR circuit 102 and the cache-miss counter (or "first count means" as used in claims) 141 counts the number of the result signal.

The memory access counter (or "second count means" as used in claims) 142 in the cache-miss rate measuring circuit 140 receives a memory access indication signal transferred from the micro-processor 101, and counts the number of the memory access operations which are performed to external memory (not shown, for example, a main memory and the like) and the cache memory including way 0 and way 1. The cache-miss rate value store queue 143 generates the cache-miss rate by using the data items stored in the cache-miss counter 141 and the memory access counter 142. The cache-miss rate store queue 143 also stores the cache-miss rate and transfers it to the way number control circuit 150.

The way number control circuit (or "way number determination means" as used in claims) 150 determines the way number to be accessed based on the change of the cache-miss rate obtained from the cache-miss rate store queue 143 and transfers the result of the determination indicating the way number to be accessed to the power control circuit (or "way operation control means" as used in claims) 160.

The power control circuit 160 selects the way to be accessed based on the control signal transferred from the way number control circuit 150 and controls to supply a power source to the selected way per way. That is, the power control circuit 160 supplies the power such as the voltage of the power source to the cache tag memory 110, the comparator 120 and the cache RAM 130 in the selected way and does not supply the power source to the way that is not selected.

For example, in the cache memory of the 2-way set associative type, one way (one half way in the entire ways) or all of the ways is selected as to be accessed.

The cache-controller 190 controls operations when the cache-miss is happened, for example, it controls the access operation to the main memory (not shown) or the replace operation of data items stored in the cache memory 103.

Next, the operation of the cache memory 103 and peripheral circuits 102, 140, 150, and 170 in the information processing device in the micro-processor semiconductor chip 100 shown in FIG. 1 will be explained.

First of all, an execution unit (not shown) in the microprocessor 101 transfers an address data item indicating a memory field to be accessed through the address bus group 170. The cache tag memory 110 and the cache data RAM 130 in the cache memory 103 receive the index in the address data item on the address bus group 170. In each way 0 and way 1, an address tag in the cache tag memory 110 that is associated with the index data in the address data item is read out and then compared with the tag in the address data on the address bus group 170. When agreed with to each other, a data item in the cache data memory 130 addressed by the index field in the address data item on the address bus group 170 is read out. Thus, when both tag addresses are agreed, this access operation is called as "cache-hit" and if they are not agreed, this operation is called as "cache-miss".

When the cache hit operation is occurred, the obtained data item from the cache data memory 130 is transferred to the data bus group 180 through the bus transceiver 131. The micro-processor 101 receives the data item on the data bus group 180.

On the other hand, if the cache-miss is happened, namely address tags are not agreed in all of the ways in the cache memory 103, the cache controller 190 accesses the main memory (not shown) and reads required data items from the main memory (not shown) and stores the required data items obtained from the main memory (not shown) to the cache data memory 130. In other words, the cache controller 190 performs refiling operation for the cache memory 103.

Figure 2:
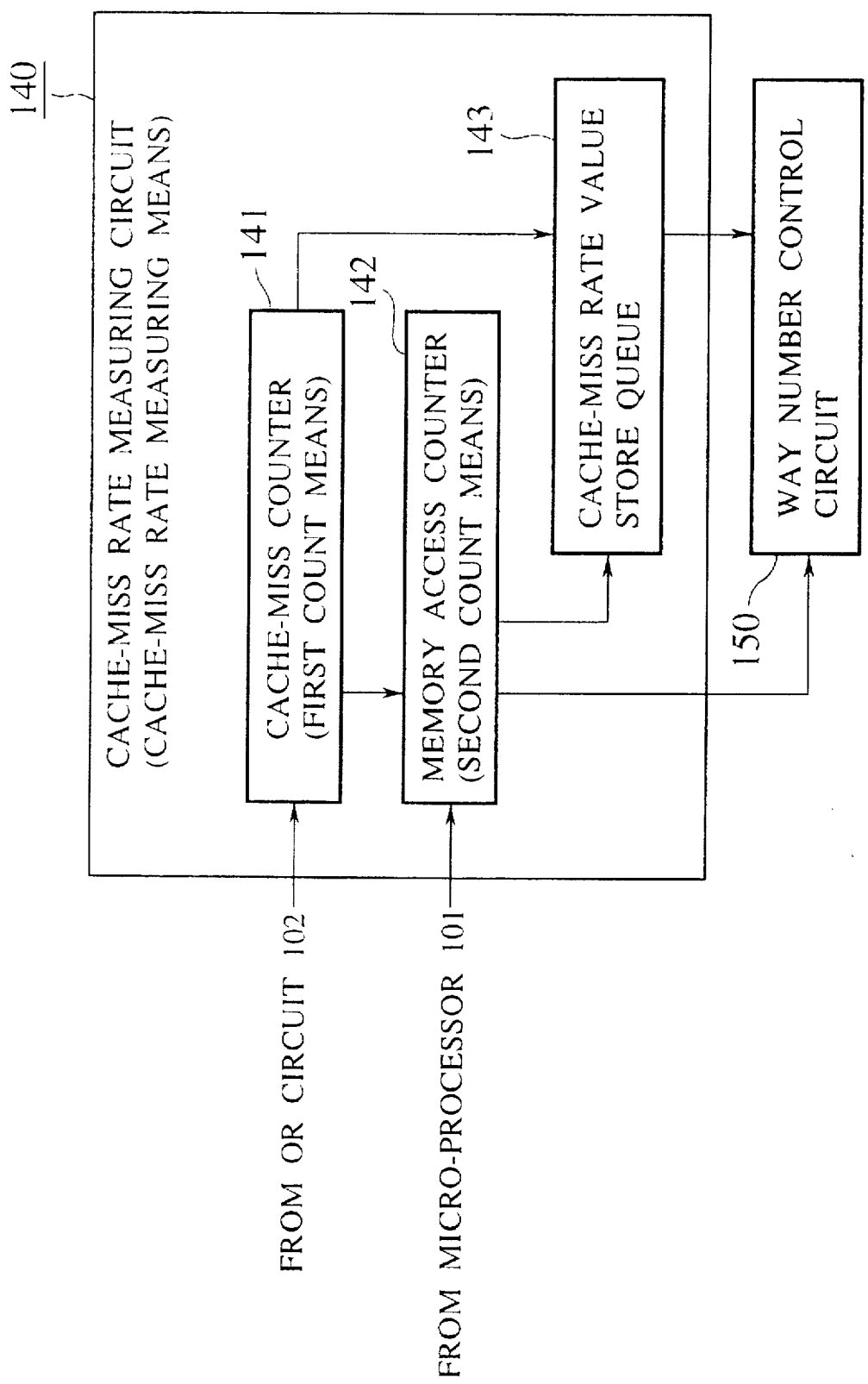
FIG. 2 is a diagram showing a configuration of a cache-miss rate measuring circuit for controlling the operation of the cache memory incorporated in the micro-processor semiconductor chip shown in FIG. 1.

FIG. 2 is a diagram showing a configuration of the cache-miss rate measuring circuit 140 for controlling the operation of the cache memory 103 incorporated in the micro-processor semiconductor chip 100 as shown in FIG. 1. The cache-miss rate measuring device 140 comprises the cache-miss counter (first count means) 141 for measuring or counting and storing the number of the cache-miss operations, the memory access counter (second count means) 142 for counting and storing the number of the memory access operations, and the cache-miss rate value store queue 143.

When executing a memory access operation, the microprocessor 101 generates a control signal indicating the memory access operation and transfers it to the memory access counter 142 in the cache-miss rate measuring circuit 140. The memory access counter 142 receives this control signal. Thus, when the memory access operation is occurred by the micro-processor 101, the value stored in the memory access counter 142 is incremented by 1. The cache-miss counter 141 is incremented by 1 when the cache-miss operation is happened during the memory access operation. Specifically, the cache-miss counter 141 receives a pulse control signal indicating the occurrence of the cache-miss transferred from the OR circuit 102 and counts and stores the number of the pulse control signal.

When the value stored in the cache-miss counter 141 reaches a predetermined value, the cache-miss rate value store queue 143 receives and stores the cache-miss value (as the cache-miss rate indicating the ratio of the number of the cache-miss operations to the number of the memory access operations) which corresponds to the first "1" position observed from Most Significant Bit (MSB) in a bit array (not shown) in the memory access counter 142.

This predetermined value can be expressed by a power of 2. In this case, we will use that the predetermined value is 256. For example, a 8 bit binary counter used as the cache-miss counter 141.

Next, we will explain the cache-miss rate value stored in the cache-miss rate value store queue 143.

The cache-miss rate, which indicates the ratio of the number of the cache-miss operations to the number of the memory access operations, can be obtained by the following equation:

Cache-miss rate=number of cache-miss operations (MN) /number of memory access operations (AN).

However, it is difficult or complicated in configuration to realize a circuit executing this equation formed on the information processing device. In order to solve this difficulty, in the embodiment of the present invention, the first "1" bit position counted from MSB side in the bit array of the memory access counter 142 when the value stored in the cache-miss counter 141 reaches the predetermined value is used as the cache-miss rate value.

The value in the memory access counter 142 when the cache-miss counter 141 reaches the predetermined value (256) is proportional to the reciprocal of the cache-miss rate (=MN/AN).

When the cache-miss rate becomes high, the number of the memory access operations until the number of the cache-miss operations reaches the predetermined value is decreased (for example, when the cache-miss rate is 100 percents, both of the number of the cache-miss operations and the number of the memory access operations become same, and the cache-miss rate becomes the minimum value). When the cache-miss rate becomes lower, the number of the memory access operations is increased until the number of the cache-miss operations reaches the predetermined value. Accordingly, the value stored in the memory access counter 142 when the value in the cache-miss counter 141 reaches the predetermined value can be used as the cache-miss rate.

Because a rough estimate value for the cache-miss rate can be used in this embodiment, the bit position of the first "1" observed from the MSB in the memory access counter 142 can be used as the cache-miss rate value. This first "1" bit position can roughly indicate the cache-miss rate.

As described above in detail, the first "1" bit position in the memory access counter 142 can roughly indicate the reciprocal of the cache-miss rate value in the cache memory of this embodiment.

The value in the memory access counter 142 is initialized by a control signal transferred from the cache-miss counter 141 when the value of the cache-miss counter 141 reaches the predetermined value after the cache-miss measuring operation is completed. The cache-miss rate obtained by the manner described above is stored into the cache-miss rate value store queue 143.

Figure 3:
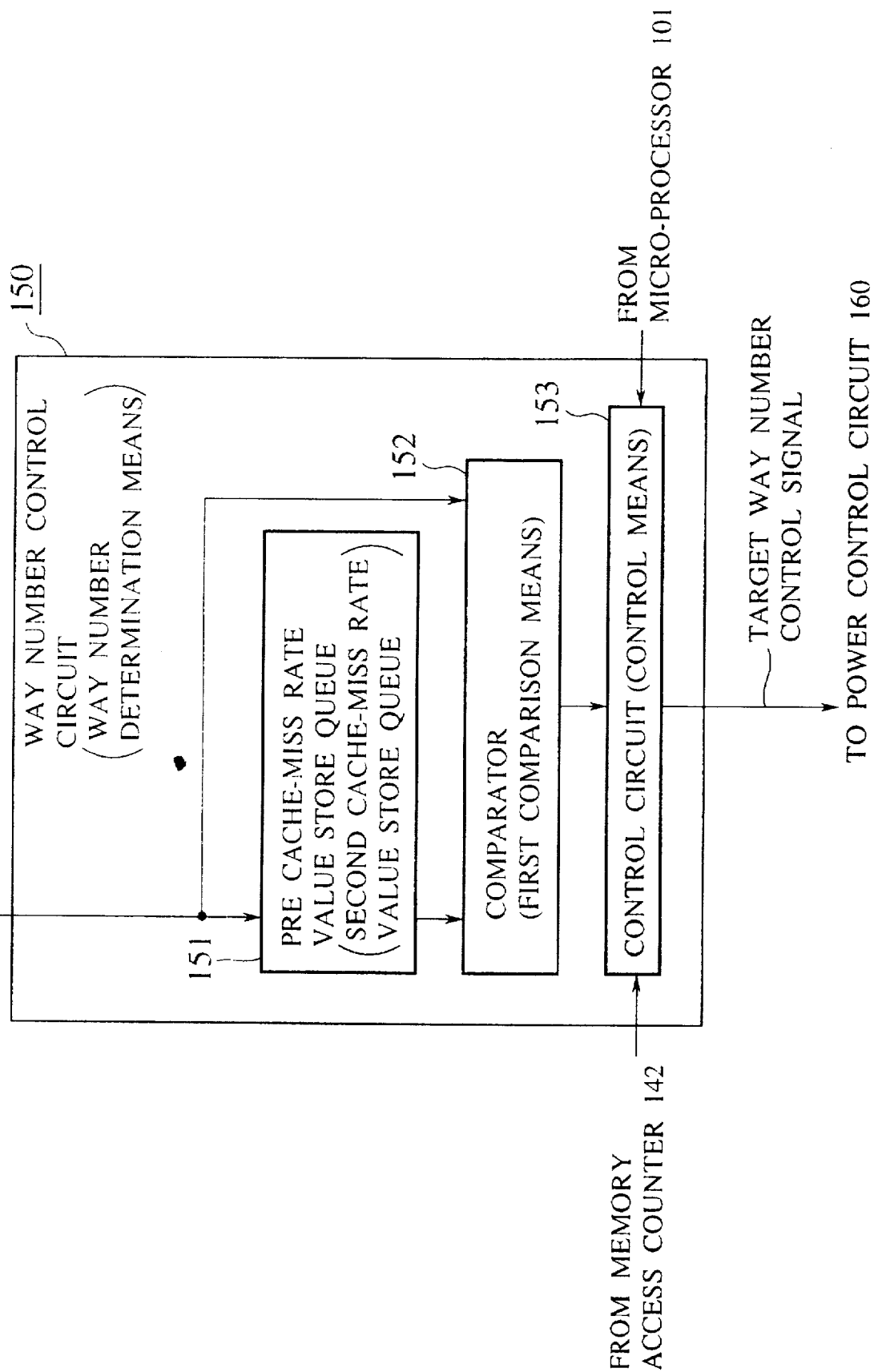
FIG. 3 is a diagram showing a configuration of the way number control circuit for controlling the operation of the cache memory.

FIG. 3 is a diagram showing a configuration of the way number control circuit (or "way number control means" as used in claims) 150 for controlling the operation of the cache memory shown in FIG. 1.

As shown in FIG. 3, the way number control circuit 150 comprises a previous cache-miss rate value store queue 151, a comparator (first comparison means) 152, and a control means 153.

The control means 153 receives a comparison result from the comparator 152. The control means 153 generates a control signal indicating the selected way to be accessed. This control signal is generated based on the comparison result transferred from the comparator 152 that compares the value stored in the previous cache-miss rate value store queue 151 with the value in the cache-miss rate value store queue 143. The control circuit 153 transfers the control signal to the power control circuit 160.

The previous cache-miss rate value store queue 151 stores the cache-miss rate value which has been measured at a previous time. The comparator 152 compares the previous cache-miss rate value stored in the previous cache-miss store value queue 151 and the cache-miss rate value stored in the cache-miss are value store queue 143 which is obtained at the present time. The comparator 152 transfers the comparison result to the control circuit 153.

The control circuit 153 receives the control signal indicating the generations of the predetermined numbers of the memory access operations transferred from the memory access counter 142 and then generates the control signal indicating the way to be accessed based on the comparison result and transfers the generated control signal to the power control circuit 160. The power control circuit 160 receives the control signal and then operates the way based on the control signal.

Thus, the way number control circuit 150 determines the way to be accessed by checking the change of the cache-miss rate based on the values stored in the cache-miss rate value store queue 143 and the previous cache-miss rate value store queue 151.

Next, the control operation of the way number control circuit 150 will be explained.

First of all, a pre-process operation which is executed before the process to decrease the number of ways to be executed will be explained.

The pre-process operation must be executed in order to avoid the increasing of the cache-miss rate temporally when required data items are stored in the way that is eliminated from the access operation without executing of the pre-process operation.

First, we assume that the number of ways is decreased from two ways to one way. In this case, way 1 is eliminated from the access operation. In other words, the power source is disconnected from the way 1. Next, the following processes (a) to (c) are executed during a predetermined time period (namely, while the memory access operation are executed 1024 times).

(a) When the cache-miss operation is happened, the data item to be accessed must be stored into the way 0.

(b) When the cache-hit operation is happened in data read operation from way 1, the data items accessed in one access operation, including the data item as a target data item are copied to a predetermined memory field in way 0. This process is executed by transferring the data items from the bus-transceiver 131 in way 1 to the data bus 180 and by writing the data items to the cache data RAM 130 through the bus transceiver 131 in way 0. In a write back type cache memory, it is also required to copy the data items that have been already stored in way 0 to way 0, again.

(c) When the cache-hit operation is occurred in the data write operation to way 1, the updated data items are also stored into way 0. This operation is performed through the bus transceiver 131 and the data bus group 180 like the data read operation described in (b). Further, in the write back type cache memory, data items are copied to the main memory (not shown).

It can be avoided by the pre-process operations described above that the cache-miss rate temporally increased.

The time period and the number of pre-process operations are determined based on the data stored in the memory access counter 142. That is, when the value in the memory access counter exceeds the predetermined numbers (for example 1024 times) the control signal indicating that the predetermined time period is elapsed is transferred from the memory access counter 142 to the control circuit 153 in the way number control circuit 150. In this embodiment, the time period for executing the pre-process operations is determined based on the value stored in the memory access counter 142, but the present invention is not limited by this embodiment, for example it can be permitted to use another counter only for measuring the execution time period of the pre-process operations.

Figure 4:
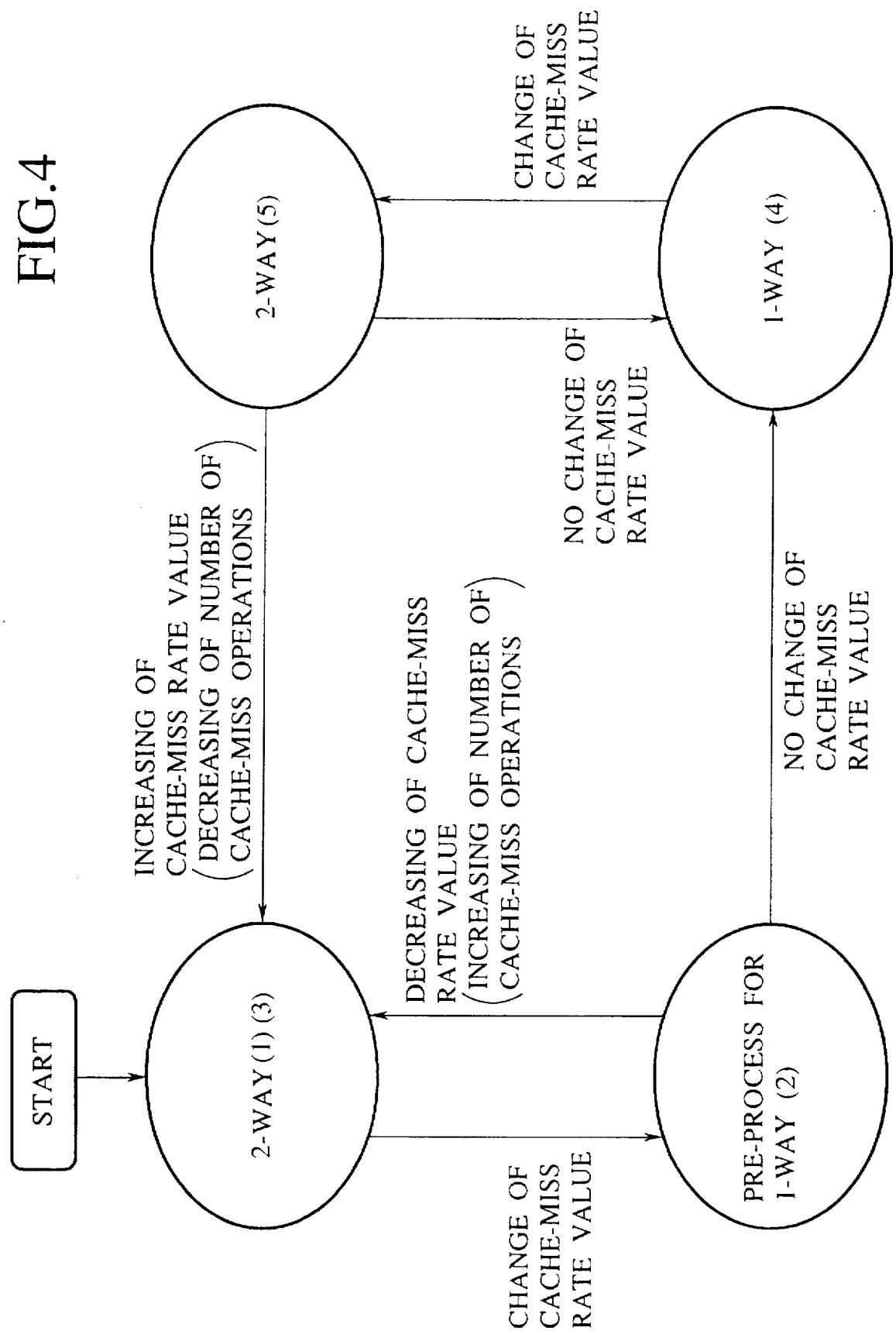
FIG. 4 is a diagram showing operation flow of the way number control circuit shown in FIG. 3 for controlling the operation of the cache memory incorporated in the microprocessor semiconductor chip shown in FIG. 1.

FIG. 4 is a diagram showing operation flow of the way number control circuit 150 shown in FIG. 3 for controlling the operation of the cache memory incorporated in the micro-processor semiconductor chip as shown in FIG. 1.

(1) First of all, the cache memory 103 is entered to the 2 way set associative operation mode (or 2 way operation mode). A predetermined time period is elapsed (here, the time period means that the memory access counter 142 counts 1024 memory access operations), the operation is shifted to the pre-process for one way process in order to detect the optimum way number in the current processing state.

(2) In the pre-process operation mode for one way process, the pre-process is executed before the operation flow is completely shifted to the one way process in order to decrease the activated way number from two ways to one way. In addition, the optimum way number for the current process state is detected. That is, when the cache-miss rate does not exceed the predetermined value, the process flow of the cache memory 103 is shifted to the one way process operation (see (4) described later). Unfortunately, if the cache-miss rate is increased, the number of the activated ways is changed from one way to two ways. Then, the process flow goes to the following process (3).

(3) When the cache memory 103 is executed under the 2 way operation mode, namely both way 0 and way 1 are executed (or activated), and when the cache-miss rate exceeds the predetermined value, the operation flow is shifted to the pre-process operation mode (2) in order to determine the optimum operation mode for the current operation state, because it can be predicted that the memory access pattern of the current operation state is changed.

(4) During the one way operation mode, when the cache-miss rate exceeds the predetermined value, because it can be predicted that the memory access pattern is changed, the operation flow is shifted to the 2' way operation mode (5) described below in order to determine the optimum operation mode for the current operation state.

(5) The 2' way operation mode is the pre-operation mode executed for the 2 way operation mode before the flow is completely switched to the 2 way operation mode. In this 2' way operation mode, the number of ways to be executed is increased to 2 and detects the cache-miss rate in order to determine the optimum way number for the current operation state. In this situation, when the cache-miss rate exceeds the predetermined value (this means that the number of occurrences of cache-miss operations is decreased when the number of ways to be accessed is increased), in order to shift the operation mode to the 2 way operation mode (3). On the other hand, the cache-miss rate does not exceed the predetermined value (this means there is no effect by increasing the number of ways to be executed), the operation flow is shifted to the one way operation mode (4) where the number of ways is one after the pre-process operation is completed in order to decrease the number of ways to be accessed.

As described above in detail, the cache memory according to the present invention can execute the operation using the optimum number of ways.

Next, we will explain the relationship between the change of the cache-miss rate value and the number of the ways in the operation flow described above.

FIG. 5 is an explanation diagram showing the relationship between cache-miss rate values stored in the cache-miss rate value store queue 143, cache-miss rates, and execution time periods in the cache memory 103 incorporated in the micro-processor semiconductor chip 100 as shown in FIG. 1.

The calculation of the cache-miss rate values, cache-miss rates and the relative execution time period are performed under the condition that cache-miss penalty is 20 clocks, the frequency to execute the memory access instruction is approximately 30 percents. In this case, the relative execution time period is obtained as the relative value of the execution time period of 1 when the cache-miss rate is zero.

The cache-miss rate value stored in the cache-miss rate value store queue 143 and the previous cache-miss rate value store queue 151 are data corresponding to the first "1" bit position counted from MSB side in a bit array when the cache-miss counter 141 reaches the predetermined value (for example, reached to "256"). That is, the cache-miss rate of "1" indicates the case that the range of the value in the memory access counter 142 is from 256 to 511 when the value in the cache-miss counter 141 reaches 256. The cache-miss rate of "2" indicates that the range of the value stored in the memory access counter 142 is from 512 to 1023 when the value in the cache-miss counter 141 reaches 256. Other cases can be shown in the same manner.

As clearly shown in FIG. 5, when the cache-miss rate value is over 7, the cache-miss operation time period in the total execution time period of the memory access operation is not more than 10 percents. In this case, the change of the cache-miss rate does not affect the total execution time period of the memory access operation.

On the other hand, when the cache-miss rate value is not more than 4, the change of the cache-miss rate strongly affects. Therefore in the control of the operation flow in the information processing device of this embodiment as shown in FIG. 3, the following processes (6) to (8) to change the number of ways to be accessed are performed when the cache-miss rate is changed.

(6) The cache-miss rate value is changed by 1 when the range of the cache-miss rate value is from 1 to 4.

(7) The cache-miss rate value is changed by 2 or more when the range of the cache-miss rate value is from 5 to 7.

(8) The number of ways is not changed when the cache-miss rate value is not less than 8.

Since the processes (6) to (8) are changed in each case for example based on the system configuration of an information processing device, the most suitable values must be determined for the information processing device.

In addition, the most suitable parameters such as the pre-process execution time period and the time period from the start of the operation of the information processing device to the start of the process for changing the number of ways must also be determined based on the system configuration. In this embodiment, although the value "1024" are used for the pre-process execution time period, a small value can be used instead of this number 1024 when the volume of a cache memory is small.

When the miss penalty is large, for example not less than 20 clocks, the change of the cache-miss rate value must be precisely checked in order to determine the optimum number of ways. When the miss penalty is small, for example not more than 10 clocks, the change of the cache-miss rate value is roughly checked in order to determine the optimum number of ways.

Furthermore, as described above, although the change of the cache-miss rate is detected by using the change of the first "1" bit position counted from MSB when the number of the cache-miss operations reaches the predetermined value in this embodiment, it can be permitted that the change of the cache-miss rate is calculated by using the following variable:

Variable=number of memory access operations /predetermined number of cache-miss operations.

That is, the reciprocal of the cache-miss rate is precisely calculated and then the difference between two reciprocals obtained at different time is calculated by a different circuit.

In addition, although the cache memory of 2 way set associative type is used for explanation in this embodiment of the present invention, the present invention is not limited by this case, for example, the present invention can be applied to a cache memory of 4 set associative type. In this case of the 4-set associative type cache memory, the control method described above can be applied when two operation modes (one mode is a case in which only one way is activated and other mode is a case that all of ways are activated) are used. Furthermore, when the 4-way set associative type cache memory is used, it can be possible to execute three operation modes such as 4-way operation mode, 2-way operation mode, and 1 way operation mode.

Moreover, although only a cache-miss rate value is stored in the cache-miss rate value store queue 143 in this embodiment, a plurality of cache-miss rate values can also be stored in the cache-miss rate value store queue 143. In this case, the optimum number of ways to be executed can be determined based on memory access patterns during a relatively long access time period without affecting the change of cache-miss rate caused temporary by switching processes.

When the number of ways to be executed is decreased, the operation of a way is directly stopped (in a case of a wright-through operation), or the operation of a way can be stopped after data items to be updated are copied (in write back operation case), without executing of the pre-process operation described above. In this case, the increasing of the cache-miss rate may be omitted during memory access operations of 1024 times.

As described above in detail, the cache memory and the information processing device of the present invention can reduce the power consumption without decreasing the performance of the cache memory and the information processing device by cutting the supply of a power source to excess ways in the cache memory.

While the above provides a full and complete disclosure of the preferred embodiment of the present invention, various modifications, alternate constructions and equivalents any be employed without departing from the true spirit and scope of the invention. Therefore the above description and illustration should not be construed as limiting the scope of the present invention, which is defined by the appended claims.

What is claimed is:

1. A cache memory of a set associative type comprising:
   a plurality of ways;
   cache-miss rate measuring means for measuring a cache miss rate relating to the number of occurrences of cache-misses, in which no target data item to be accessed is stored in the cache memory, in the plurality of ways;
   way number determination means for selecting ways to be accessed in the plurality of ways based on the change of the cache-miss rate obtained from the cache-miss rate measuring means; and
   way operation control means for executing the ways selected by the way number determination means.

2. A cache memory as claimed in claim 1, wherein the cache-miss rate measuring means comprises:
   first count means for counting and storing an occurrence number of the cache miss operations caused in the plurality of ways;
   second count means for counting and storing an occurrence number of memory access operations; and
   first cache miss rate value store queue for storing at least a value indicating the cache-miss rate at a time,
   wherein a value corresponding to a first position of a first value counted from the Most Significant Bit (MSB) side in a bit pattern forming the second count means is stored as the cache-miss rate into the first cache-miss rate value store queue when the value stored in the first count means reaches a predetermined value.

3. A cache memory as claimed in claim 2, further comprises an OR circuit incorporated between the plurality of ways and the first count means for detecting an occurrence of the cache-miss operation happened in the plurality of ways and for transferring a data item indicating the occurrence of the cache-miss operation to the first counter means.

4. A cache memory as claimed in claim 1, wherein the way number determination means comprises:
   a second cache-miss rate value store queue for storing the cache-miss rate value, transferred from the cache-miss rate measuring means, which has been measured in a previous time;

first comparison means for comparing the cache-miss rate at the present time stored in the first cache-miss rate measuring means with the cache-miss rate at the previous time stored in the second cache-miss rate store queue; and control means for receiving the comparison result transferred from the first comparison means when the number of the memory access operations to a memory exceeds a predetermined number, for selecting ways to be accessed in the plurality of ways based on the comparison result, and for transferring information about the selected ways to the way operation control means.

5. A cache memory as claimed in claim 2, wherein the way number determination means comprises:

a second cache-miss rate store queue for storing the cache-miss rate value, transferred from the first cache-miss rate value store queue, which has been measured in a previous time;

first comparison means for comparing the cache-miss rate at the present time stored in the first cache-miss rate value store queue with the cache-miss rate value at the previous time stored in the second cache-miss rate value store queue; and control means for receiving the comparison result transferred from the first comparison means when the number of the memory access operations to a memory exceeds a predetermined number, for selecting ways to be accessed in the plurality of ways based on the comparison result, and for transferring information about the selected ways to the way operation control means.

6. A cache memory as claimed in claim 2, wherein the way operation control means controls the operation of the plurality of ways by switching the supply of electric power source to each of the plurality of ways based on information transferred from the way operation control means.

7. A cache memory as claimed in claim 2, wherein the way operation control means controls the operation of the plurality of ways by switching the supply of electric power source to each of the plurality of ways based on the selection result transferred from the control means.

8. A cache memory as claimed in claim 1, wherein when the cache-miss is happened under a condition that the number of the plurality of ways to be accessed is decreased, data items to be accessed are stored into a first way which will be continuously accessed, and data items to be accessed are stored into the first way when a cache-hit operation is happened in a second way which will not be accessed in following times, the data items to be stored into the second way are also stored into the first way, and these operation are performed during a predetermined time period.

9. An information processing device comprising:

a cache memory of a set associative type including:
a plurality of ways:
cache-miss rate measuring means for measuring a cache-miss rate relating to the number of occurrences of cache-misses, in which no target data item to be accessed is stored in the cache memory, in the plurality of ways;
way number determination means for selecting ways to be accessed in the plurality of ways based on the change of the cache-miss rate obtained from the cache-miss rate measuring means;
way operation control means for executing the ways selected by the way number determination means; and a microprocessor connected to the cache memory through buses;
wherein the microprocessor generates a control signal indicating occurrence of the memory access operation to the cache memory and an external memory and transfers the control signal to the cache-miss rate measuring means.

10. An information processing device as claimed in claim 9, wherein at least both of the cache memory and the microprocessor are formed on a single semiconductor chip.

11. An information processing device comprising:

a cache memory of a set associative type including:
a plurality of ways;
cache-miss rate measuring means for measuring a cache-miss rate relating to the number of occurrences of cache-misses, in which no target data item to be accessed is stored in the cache memory, in the plurality of ways;
way number determination means for selecting ways to be accessed in the plurality of ways based on the change of the cache-miss rate obtained from the cache-miss rate measuring means; and
way operation control means for executing the ways selected by the way number determination means,
wherein the cache-miss rate measuring means includes:
first count means for counting and storing an occurrence number of cache-miss operations caused in the plurality of ways;
second count means for counting and storing an occurrence number of memory access operations; and
a first cache-miss rate value store queue for storing at least a value indicating the cache-miss rate at a time,
wherein a value corresponding to a first position of a first value counted from the Most Significant Bit (MSB) side in a bit pattern forming the second count means is stored as the cache-miss rate into the first cache-miss rate value store queue when the value stored in the first count means reaches a predetermined value; and a microprocessor connected to the cache memory through buses,
wherein the microprocessor generates a control signal indicating occurrence of the memory access operation to the cache memory and an external memory and transfers the control signal to the cache-miss rate measuring means.

12. An information processing device as claimed in claim 11, wherein at least both of the cache memory and the microprocessor are formed on a single semiconductor chip.

13. An information processing device comprising:

a cache memory of a set associative type including:
a plurality of ways;
cache-miss rate measuring means for measuring a cache-miss rate relating to the number of occurrences of cache-misses, in which no target data item to be accessed is stored in the cache memory, in the plurality of ways;
way number determination means for selecting ways to be accessed in the plurality of ways based on the change of the cache-miss rate obtained from the cache-miss rate measuring means; and
way operation control means for executing the ways selected by the way number determination means;
wherein the way number determination means includes:
a cache-miss rate value store queue for storing the cache-miss rate value, transferred from the cache-miss rate measuring means, which has been measured in a previous time;

first comparison means for comparing the cache-miss rate at the present time stored in the cache-miss rate measuring means with the cache-miss rate at the previous time stored in the second cache-miss rate value store queue; and control means for receiving the comparison result transferred from the first comparison means when the number of memory access operations to a memory exceeds a predetermined number, for selecting ways to be accessed in the plurality of ways based on the comparison result, and for transferring information about the selected ways to the way operation control means; and a microprocessor connected to the cache memory through buses, wherein the microprocessor generates a control signal indicating occurrence of the memory access operation to the cache memory and an external memory and transfers the control signal to the cache-miss rate measuring means.

14. An information processing device as claimed in claim 13, wherein at least both of the cache memory and the microprocessor are formed on a single semiconductor chip.

15. An information processing device comprising:

the cache memory as claimed in claim 5; and a microprocessor connected to the cache memory through buses, wherein the microprocessor generates a control signal indicating occurrence of the memory access operation to the cache memory and an external memory and transfers the control signal to the cache-miss rate measuring means.

16. An information processing device as claimed in claim 11, wherein at least both of the cache memory and the microprocessor are formed on a single semiconductor chip.

17. An information processing device comprising:

a cache memory of a set associative type includes:

a plurality of ways;

cache-miss rate measuring means for measuring a cache-miss rate relating to the number of occurrences of cache-misses, in which no target data item to be accessed is stored in the cache memory, in the plurality of ways;

way number determination means for selecting ways to be accessed in the plurality of ways based on the change of the cache-miss rate obtained from the cache-miss rate measuring means; and way operation control means for executing the ways selected by the way number determination means;

wherein when the cache-miss is happened under a condition that the number of the plurality of ways to be accessed is decreased, data items to be accessed are stored into a first way which will be continuously accessed, and data items to be accessed are stored into the first way when a cache-hit operation has happened in a second way which will not be accessed in following times, the data items to be stored into the second way are also stored into the first way, and these operations are performed during a predetermined time period; and a microprocessor connected to the cache memory through buses, wherein the microprocessor generates a control signal indicating occurrence of the memory access operation to the cache memory and an external memory and transfers the control signal to the cache-miss rate measuring means.

18. An information processing device as claimed in claim 17, wherein at least both of the cache memory and the microprocessor are formed on a single semiconductor chip.

* * * * *